United States Patent
Anderson et al.

[11] Patent Number: 5,494,267
[45] Date of Patent: Feb. 27, 1996

[54] PUMPABLE CASTING COMPOSITION AND METHOD OF USE

[75] Inventors: Michael W. Anderson, Bloomingdale; Shirish Shah, Carol Stream, both of Ill.

[73] Assignee: Magneco/Metrel, Inc., Addison, Ill.

[21] Appl. No.: 280,474

[22] Filed: Jul. 26, 1994

[51] Int. Cl.$^6$ ............................................. C21B 7/04
[52] U.S. Cl. ........................... 266/281; 266/275; 264/30; 501/103
[58] Field of Search ..................... 266/280, 275, 266/281, 44; 264/30; 501/89, 103

[56] References Cited

U.S. PATENT DOCUMENTS

| | | | |
|---|---|---|---|
| 2,741,822 | 4/1956 | Udy | 25/157 |
| 3,041,205 | 6/1962 | Iler | 117/129 |
| 3,067,050 | 12/1962 | Miller, Jr. | 106/65 |
| 3,353,975 | 11/1967 | Shannon et al. | 106/65 |
| 3,432,312 | 3/1969 | Feagin et al. | 106/38.3 |
| 3,652,307 | 3/1972 | Bakker | 106/65 |
| 3,842,760 | 10/1974 | Parsons et al. | 106/56 |
| 3,892,584 | 7/1975 | Takeda et al. | 106/56 |
| 3,920,578 | 11/1975 | Yates | 252/313 S |
| 4,018,615 | 4/1977 | Mills | 106/69 |
| 4,041,199 | 8/1977 | Cartwright | 428/36 |
| 4,056,399 | 11/1977 | Kirkpatrick et al. | 106/69 |
| 4,061,501 | 12/1977 | Ivarsson et al. | 106/44 |
| 4,069,057 | 1/1978 | Kamei et al. | 106/55 |
| 4,128,431 | 12/1978 | Svec | 106/38.35 |
| 4,139,393 | 2/1979 | Chandhok | 106/38.3 |
| 4,222,782 | 9/1980 | Alliegro et al. | 106/57 |
| 4,226,625 | 10/1980 | Delcorio et al. | 106/38.22 |
| 4,331,773 | 5/1982 | Hongo et al. | 501/128 |
| 4,342,597 | 8/1982 | Brown | 106/38.27 |
| 4,427,800 | 1/1984 | Nakamura et al. | 523/145 |
| 4,476,234 | 10/1984 | Jones et al. | 501/89 |
| 4,751,204 | 6/1988 | Kyoden et al. | 501/89 |
| 4,780,142 | 10/1988 | Rechter | 106/84 |
| 4,800,181 | 1/1989 | Lassiter et al. | 501/89 |
| 4,916,092 | 4/1990 | Tiegs et al. | 501/89 |
| 5,147,830 | 9/1992 | Banerjee et al. | 501/89 |
| 5,147,834 | 9/1992 | Banerjee | 501/129 |
| 5,240,498 | 8/1993 | Matalon et al. | 106/162 |
| 5,284,808 | 2/1994 | Damiano et al. | 501/103 |
| 5,362,033 | 11/1994 | Sakuai et al. | 266/275 |

FOREIGN PATENT DOCUMENTS

| | | |
|---|---|---|
| 0535233 | 10/1992 | European Pat. Off. . |
| 71-051262 | 3/1973 | Japan . |
| 71-065558 | 4/1973 | Japan . |
| 84-222731 | 5/1986 | Japan . |
| 84-277985 | 7/1986 | Japan . |
| 92/18440 | 10/1992 | WIPO . |

Primary Examiner—Scott Kastler
Attorney, Agent, or Firm—Maxwell J. Petersen; Willian Brinks Hofer Gilson & Lione

[57] ABSTRACT

An improved castable refractory composition having excellent resistance to attack from slag can be efficiently transported to a destination, such as a mold, using a pump. The castable refractory composition includes about 36–92% by weight silicon carbide, about 8–20% by weight of a colloidal silica binder, and a balance substantially of other refractory materials which can include alumina, microsilica, graphite, and a setting agent. The composition of the invention can be used alone or in addition to a conventional refractory casting material to form a refractory lining. When used together, the conventional refractory composition is used to construct a lower layer in the refractory lining, and the composition of the invention is used to construct an upper refractory layer above the lower layer.

16 Claims, 1 Drawing Sheet

PUMPABLE CASTING COMPOSITION AND METHOD OF USE

FIELD OF THE INVENTION

The present invention is a pumpable refractory composition especially adapted for the regions of molten metal containment devices which have the greatest exposure to slag, and a method of use.

BACKGROUND OF THE INVENTION

U.S. Pat. No. 5,147,830, issued to Banerjee and Connors, Jr., discloses a pumpable refractory casting composition used for forming new liners, and repairing existing liners, in molten metal containment devices. The pumpable refractory composition replaced earlier refractory compositions which were not pumpable and had to be transported using buckets and cranes. The uses for the pumpable refractory composition include, but are not limited to, tundishes, ladles, troughs, runners, blast furnaces, and other molten metal containment devices.

The compositions disclosed in U.S. Pat. No. 5,147,830 include, as a primary ingredient, 55–90% by weight of a refractory base material which can be calcined clay, mullite, brown fused alumina, tabular alumina or combinations thereof. All of these base materials include significant amounts of alumina. Calcined clay includes about 43–48% by weight alumina. Mullite includes about 57–73% by weight alumina. Brown fused alumina includes about 93–98% by weight alumina, and tabular alumina includes about 98.5–99.9% by weight alumina.

The compositions disclosed in U.S. Pat. No. 5,147,830 also include a colloidal silica binder, and may include other refractory ingredients (e.g. silicon carbide, graphite, microsilica) and a setting agent. The colloidal silica, in addition to serving as a binder, contributes excellent flow properties which facilitate the pumping of the casting composition during its application.

Many metal containment devices, for example, blast furnace runners and troughs, contain molten metal which includes some impurities. These impurities tend to float to the top of the molten metal, forming what is called a "slag" layer. The slag layer typically includes non-metallic impurities, many of which are oxidized or oxidizable, and reactive gases such as entrained oxygen or air.

Impurities in the slag layer react with the alumina and any carbon in the refractory liner, causing oxidation of carbon and general weakening of the liner. As a result, the portion of the refractory liner which is adjacent to the slag layer wears out faster than the remaining refractory liner, accelerating the time at which the refractory liner must be repaired or replaced. Therefore, there is a need or desire in the iron and steel industry for a refractory material which is especially resistant to attack from slag, and which can be used in refractory liners in regions exposed to slag.

SUMMARY OF THE INVENTION

The present invention is directed to a pumpable casting composition which is especially resistant to attack from slag, and a method of use thereof. The pumpable casting composition includes, as an essential ingredients about 36–92% by weight silicon carbide preferably having an average particle diameter of about 30 micrometers to about 3.5 millimeters. The silicon carbide is especially resistant to corrosion and other chemical reactions in the presence of slag. When silicon carbide is used in these high quantities in the casting composition, the entire composition becomes more resistant to attack from the slag layers in blast furnaces, troughs, runners, and other molten metal containment devices.

The pumpable casting composition also includes, as an essential ingredient, about 8–20% by weight of a binder which includes about 15–70% by weight colloidal silica in water. The aqueous colloidal silica serves two important functions. First, the aqueous colloidal silica provides the casting composition with ideal flow properties that permit the casting composition to be transported efficiently using a concrete pump or another similar pump, from a source to the location of the refractory lining being formed. Second, after the liner has been formed and dried, the colloidal silica serves as an excellent binder for the casting composition, providing strength and resistance to erosion during use.

The pumpable casting composition may include other refractory ingredients as needed for the particular end use application. These other refractory ingredients include, but are not limited to, about 0–10% by weight free carbon, about 0–10% by weight pitch (which is a mixture of carbon and organic volatiles), and about 0–50% by weight alumina.

An important characteristic of the casting composition is the ability to transport the composition to a mold assembly using a standard concrete pump or other similar pump. The casting composition of the invention may either be used alone (i.e. to form an entire refractory liner) or may be used in conjunction with a known casting composition. For example, a known pumpable casting composition described in U.S. Pat. No. 5,147,830, the disclosure of which is incorporated herein by reference, may be used to line the lower portion of a molten metal containment device that is not directly exposed to slag. Then, the casting composition of the invention may be layered on top of the conventional casting composition, to line the upper portion of the molten metal containment device which is directly exposed to slag. Variations of this procedure may be employed depending on the type of molten metal containment device being lined, and its size, shape and contents.

With the foregoing in mind, it is a feature and advantage of the invention to provide a pumpable casting composition that forms a refractory liner which is especially resistant to attack from slag.

It is also a feature and advantage of the invention to provide a pumpable casting composition which can be used alone or in addition to a conventional casting composition when forming a refractory liner.

It is also a feature and advantage of the invention to provide a method of forming a refractory liner that is especially resistant to attack from slag.

The foregoing and other features and advantages of the invention will become further apparent from the following detailed description of the presently preferred embodiments, read in conjunction with the accompanying example and drawing. The detailed description, examples and drawing are merely illustrative rather than limiting, the scope of the invention being defined by the appended claims and equivalents thereof.

DETAILED DESCRIPTION OF THE PRESENTLY PREFERRED EMBODIMENTS

Figure 1:
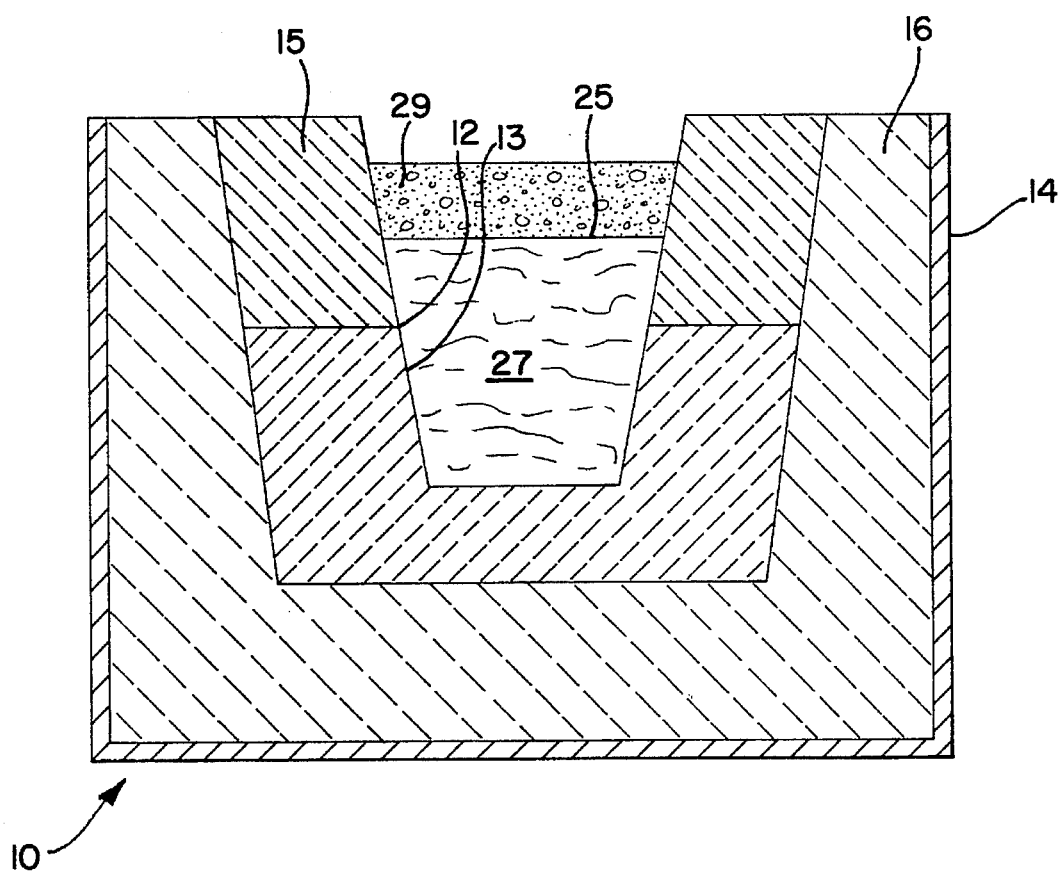
FIG. 1 is a side sectional view of a blast furnace trough filled with molten metal.

Referring to FIG. 1, a molten metal containment device 10, which is a blast furnace trough, includes an outer steel shell 14, a conventional back-up refractory lining 16, and an inner refractory lining 12. The inner refractory lining 12 includes a lower layer 13 of a conventional pumpable casting material and an upper layer 15 of the slag resistant pumpable casting composition of the invention. This invention is directed to the upper layer 15, the combination of the upper layer 15 with the lower layer 13, and, particularly to a method of forming these layers.

During operation, the molten metal containment device 10 is mostly filled with molten metal 25. The impurities in the molten metal, which tend to be lighter than the molten metal, rise to the top. As a result, the metal 25 in the trough becomes separated into a lower region 27 of purified molten metal and an upper region 29 which is the slag layer filled with impurities.

The slag ingredients attack conventional refractory lining materials based primarily on alumina, requiring periodic replacement of exposed inner linings. As explained above, the inner refractory lining 12 includes a lower layer 13 of a conventional pumpable casting material and an upper layer 15 of the slag-resistant pumpable refractory composition of the invention.

The lower refractory layer 13 is exposed primarily to the generally pure molten metal layer 27 and is not significantly exposed to the slag 29. Hence, the lower refractory layer 13 experiences only normal wear and tear, and can be formed from any of the conventional refractory compositions including, for example, the pumpable compositions disclosed in U.S. Pat. No. 5,147,830, the contents of which are incorporated herein by reference. Generally, these conventional pumpable compositions include about 55–90% by weight of a granular base material selected from calcined clay, mullite, brown fused alumina, tabular alumina and mixtures thereof; about 8–14% by weight of a silica binder formed from a dispersion of about 15–70% by weight colloidal silica in water; optionally, about 5–20% by weight calcined alumina and/or 1–35% by weight silicon carbide; and, preferably, about 0.02–1.0% by weight of a setting agent such as calcium aluminate cement or magnesium oxide, and about 1–10% by weight microsilica.

The lower refractory layer may be installed using a concrete pump or another pump as described in U.S. Pat. No. 5,147,830. In order to facilitate installation of the refractory layers 13 and 15, a mold or form may be constructed or installed in the vessel at a predetermined distance from the back-up refractory lining 16, and the refractory casting material can be injected into the space between the back-up lining 16 and the installed mold or form. A detailed description of a refractory lining installation, using a mold or form, is provided in U.S. patent application Ser. No. 08/156,163, filed on Nov. 22, 1993, the contents of which are incorporated herein by reference.

After the lower refractory layer 13 has been formed, the layer should be permitted to harden and set before the upper refractory layer 15 is formed. This setting and hardening can be accomplished at room temperature in about 15 minutes to about 5 hours, depending on the thickness of the refractory layer 13. After the lower refractory layer 13 has sufficiently hardened, the upper refractory layer 15 can be formed from the casting composition of the invention, using the same pumping equipment and procedure. The upper layer 15 should be large enough to cover the entire region of the tundish vessel 10 which is exposed to the slag layer 29 on a continuous or frequent basis.

After the upper refractory layer 15 has hardened or set for about 15 minutes to about five hours, the entire inner refractory lining 12 can be further dried, if necessary, for up to about four more hours at room temperature or at an elevated temperature not exceeding about 250° F. Then, the refractory lining 12 can be baked at a higher temperature (above 250° F.) for about 5–30 hours.

As stated above, the refractory lining 12, including the layers 13 and 15, can be formed in situ in the metal containment device 10 using the techniques described in U.S. application Ser. No. 08/156,163, filed on Nov. 22, 1993. The refractory lining 12 can alternatively be formed apart from the metal containment device using known techniques, and later inserted into the metal containment device. If the inner refractory lining 12 is only partially exposed to slag on a regular basis, as is the case with the through described above, then it is only necessary to use the refractory composition of the invention in the regions of the inner liner 12 which are frequently exposed to slag. On the other hand, if most or all of the lining 12 is to be exposed to slag, as may be the case with a slag runner, for instance, then it is desirable to construct the refractory lining entirely using the casting composition of the invention.

The pumpable casting composition of the invention includes about 36–92% by weight silicon carbide, which causes the composition to have excellent resistance to slag. Preferably, the casting composition includes about 40–85% by weight silicon carbide, most preferably about 45–80% by weight silicon carbide. Higher amounts of silicon carbide generally contribute to increased slag resistance. The silicon carbide is itself chemically resistant to attack from slag ingredients, and also helps protect other ingredients of the composition which would otherwise be less resistant The silicon carbide should have an average particle diameter between about 30 micrometers and about 3.5 millimeters, in order to promote flow of the composition during pumping and strength of the resulting lining. A wide distribution of particle sizes facilitates flow and castability of the composition.

The pumpable casting composition of the invention also includes about 8–20% by weight of an aqueous colloidal silica binder, and preferably includes about 8–14% by weight of this binder. The binder should include about 15–70% by weight colloidal silica in water, preferably about 30–50% by weight colloidal silica in water, most preferably about 40% by weight colloidal silica in water. The colloidal silica should have an average silica particle diameter of about 4–100 millimicrons, preferably about 6–50 millimicrons, most preferably about 8–20 millimicrons.

The colloidal silica binder serves two important purposes. During pumping of the casting composition, the aqueous colloidal silica imparts excellent flow properties which permit the casting composition to be easily transported from a source to a destination using a concrete pump or another suitable pump. After the refractory lining has been formed and dried, the colloidal silica acts as an excellent binder, thereby contributing strength and erosion resistance to the refractory lining.

The pumpable casting composition of the invention may include about 0–50% by weight of an alumina component, preferably about 10–40% by weight of the alumina component. The presence of alumina as a minor component improves the strength of the refractory liner without significantly increasing the susceptibility of the liner to attack from slag ingredients. The alumina component preferably has an average particle diameter of about 30 micrometers to about 7 millimeters, and is preferably selected from brown fused alumina, white fused alumina, tabular alumina, and mixtures thereof.

The casting composition of the invention may also include about 1–10% by weight microsilica having an average particle diameter of about 0.1–1.0 microns, preferably about 0.15–0.25 microns. The microsilica, whose diameter is larger than that of colloidal silica, further improves the flow of the casting composition during pumping.

The casting composition of the invention may also include about 5–20% by weight calcined alumina having an average particle diameter of about 0.2–70 microns. The calcined alumina is believed to react with the colloidal silica binder to form a sediment phase which causes further improved binding characteristics, especially at higher temperatures.

The casting composition of the invention may also include about 0–10% by weight free carbon, preferably about 2–6% free carbon, having an average particle diameter of about 40 microns to about 0.5 mm. The carbon serves as a nonwetting agent which further inhibits any chemical reaction between slag and the refractory liner. In essence, the carbon helps prevent attachment to or penetration of the refractory lining by slag. Typically, the carbon is in the form of graphite or pitch, which is a mixture of carbon and volatile organic compounds.

The casting composition of the invention preferably includes about 0.02–1.0% by weight of a setting agent. Examples of suitable setting agents include calcium aluminate cement, magnesium oxide, and mixtures thereof.

One example of a concrete pump which is suitable for use with the casting composition of the invention is the Thom-Kat TVS16-2065, available from Pultzmeister, Inc., Thomsen Division, Gardena, Calif. 90248. Such a concrete pump is described in U.S. Pat. No. 3,832,097, the disclosure of which is incorporated herein by reference, and in German Patent 2,162,406.

Other commercially available concrete pumps, and other suitable pumps, can also be used to transport the casting composition of the invention. One presently preferred pump is the Thom-Kat TS 2030 pump, available from Pultzmeister, Inc., located in Gardena, Calif.

A wide range of changes and modifications to the invention described above will be apparent to persons skilled in the art. The following Examples are not to be construed as imposing limitations on the invention, but are included merely to illustrate preferred embodiments.

EXAMPLE 1

A pumpable casting composition was prepared by mixing the following components together in the stated quantities.

| Component | Average Particle Diameter | % By Weight |
| --- | --- | --- |
| Silicon carbide | 2.5 millimeters | 35 |
| Silicon carbide | 500 microns | 22.5 |
| Silicon carbide | 50 microns | 20 |
| Colloidal silica (40% in water) | 20 millimicrons | 12 |
| Calcined alumina | 10 microns | 5 |
| Graphite | 100 microns | 2.5 |
| Microsilica | 150 millimicrons | 3 |
| Magnesia | 100 microns | 0.1 |
| TOTAL | | 100% |

The resulting casting composition had excellent flow properties and was suitable for pumping. The casting composition yielded a refractory liner which had excellent slag resistance in addition to high strength, excellent thermal shock resistance and erosion resistance. Comparative slag tests indicated that the inventive casting composition had significantly better resistance to slag attack than conventional moderate (15–20%) silicon carbide materials.

EXAMPLE 2

A pumpable casting composition was prepared by mixing the following components together in the stated weight percentages.

| Component | Average Particle Diameter | % By Weight |
| --- | --- | --- |
| Silicon carbide | 500 microns | 22.5% |
| Silicon carbide | 50 microns | 20 |
| Colloidal silica (40% in water) | 20 millimicrons | 12 |
| Brown fused alumina | 3 millimeters | 35 |
| Calcined alumina | 10 microns | 5 |
| Graphite | 100 microns | 2.5 |
| Microsilica | 150 millimicrons | 3 |
| Magnesia | 100 microns | 0.1 |
| TOTAL | | 100% |

Again, the resulting casting composition had excellent flow properties, was suitable for pumping, and yielded a refractory liner having excellent slag resistance, strength, and erosion resistance. Comparative laboratory slag corrosion tests showed considerable improvement over 20% silicon carbide materials.

While the embodiments of the invention disclosed herein are presently considered to be preferred, various improvements and modifications can be made without departing from the spirit and scope of the invention. The scope of the invention is indicated in the appended claims, and all changes that fall within the meaning and range of equivalents are intended to be embraced therein.

We claim:

1. A method of manufacturing a refractory liner, comprising the steps of:

forming a pumpable casting composition including about 36–92% by weight silicon carbide, about 8–20% by weight aqueous colloidal silica having an average particle diameter of 4–100 millimicrons, zero to about 10% by weight free carbon, and zero to about 50% by weight of an alumina component;

transporting the casting composition to a mold assembly using a pump; and molding the casting composition to form a refractory liner.

2. The method of claim 1, wherein the silicon carbide has an average particle diameter of about 30 micrometers to about 3.5 millimeters.

3. The method of claim 1 wherein the silicon carbide is present at about 40–85% by weight of the casting composition.

4. The method of claim 1, wherein the silicon carbide is present at about 45–80% by weight of the casting composition.

5. The method of claim 1, wherein the alumina component is present at about 10–40% by weight of the casting composition.

6. The method of claim 1, wherein the alumina component comprises a material selected from the group consisting of brown fused alumina, white fused alumina, tabular alumina, and mixtures thereof.

7. The method of claim 1, wherein the free carbon is present at about 2–6% by weight of the casting composition.

8. The method of claim 7, wherein the free carbon is present in the form of graphite or pitch.

9. A refractory liner formed according to the method of claim 1.

10. A method of manufacturing a refractory liner, comprising the steps of:

forming a casting composition including about 36–92 % by weight silicon carbide, about 8–20% by weight aqueous colloidal silica having an average particle diameter of 4–100 millimicrons, zero to about 10% by weight free carbon, and zero to about 50% by weight of an alumina component;

transporting the casting composition to a molten metal containment device using a pump; and forming a refractory liner from the casting composition in situ in the metal containment device.

11. The method of claim 10, wherein the casting composition further comprises about 1–10% by weight microsilica.

12. The method of claim 10, wherein the casting composition further comprises about 5–20% by weight calcined alumina.

13. The method of claim 10, wherein the casting composition further comprises about 0.02–1.0% by weight of a setting agent.

14. A refractory liner formed according to the method of claim 10.

15. A method of forming a refractory liner, comprising the steps of:

forming a lower refractory layer using a casting composition which includes about 55–90% by weight of a granular base material selected from the group consisting of calcined clay, mullite, brown fused alumina, tabular alumina and mixtures thereof, a colloidal silica binder having an average particle diameter of 4–100 millimicrons, and up to about 35 % by weight silicon carbide;

hardening the lower refractory layer;

forming an upper refractory layer above the lower refractory layer using a casting composition which includes about 36–92 % by weight silicon carbide, a colloidal silica binder having an average particle diameter of 4–100 millimicrons, zero to about 10% by weight graphite, and zero to about 50% by weight of an alumina component;

hardening the upper refractory layer; and heating the upper and lower refractory layers at above 250° F.

16. A refractory liner formed according to the method of claim 15.

* * * * *